US006989785B2

(12) United States Patent
Sievenpiper et al.

(10) Patent No.: US 6,989,785 B2
(45) Date of Patent: Jan. 24, 2006

(54) LOW-PROFILE, MULTI-BAND ANTENNA MODULE

(75) Inventors: Daniel F. Sievenpiper, Los Angeles, CA (US); Gregory L. Tangonan, Oxnard, CA (US); Hui-Pin Hsu, Northridge, CA (US); Robert M. Riley, Jr., Novi, MI (US); Gary J. Hanselman, Washington, MI (US)

(73) Assignee: General Motors Corporation, Detroit, MI (US)

( * ) Notice: Subject to any disclaimer, the term of this patent is extended or adjusted under 35 U.S.C. 154(b) by 100 days.

(21) Appl. No.: 10/679,572

(22) Filed: Oct. 6, 2003

(65) Prior Publication Data

US 2005/0073456 A1 Apr. 7, 2005

(51) Int. Cl.
*G01S 7/28* (2006.01)

(52) U.S. Cl. .................. 342/175; 455/553.1; 343/722; 343/715

(58) Field of Classification Search ................ 342/175; 343/700 MS, 702, 715, 722, 725, 729, 749, 343/757, 787, 846, 850, 860; 455/78, 82, 455/84, 107, 121, 125, 193.1, 282, 552.1, 455/553.1; 370/208, 330, 468, 478; 375/345
See application file for complete search history.

(56) References Cited

U.S. PATENT DOCUMENTS 5,734,352 A * 3/1998 Seward et al. .............. 343/722
6,107,972 A * 8/2000 Seward et al. .............. 343/722
6,133,879 A * 10/2000 Grangeat et al. ..... 343/700 MS
6,256,495 B1 * 7/2001 Francisco et al. ........ 455/552.1
6,297,711 B1 * 10/2001 Seward et al. .............. 333/129
6,441,792 B1 8/2002 Sievenpiper et al. ........ 343/713
6,609,010 B1 * 8/2003 Dolle et al. .............. 455/552.1
6,661,380 B1 * 12/2003 Bancroft et al. ..... 343/700 MS
6,788,268 B2 * 9/2004 Chiang et al. ............. 343/850
6,816,714 B2 * 11/2004 Toncich ...................... 455/107
2002/0175878 A1 * 11/2002 Toncich ...................... 343/860
2003/0053569 A1 * 3/2003 Vilhonen .................... 375/345
2003/0193439 A1 * 10/2003 Park ........................... 343/702

(Continued)

OTHER PUBLICATIONS

"Multimode antenna selection for spatial multiplexing systems with linear receivers", Heath, R.W., Jr.; Love, D.J. Signal Processing, IEEE Transactions vol.: 53 Issue: 8 Part=2, Aug. 2005 Ps: 3042-3056.*
"High-Q micromachined resonant cavities in a K-band diplexer configuration", Hill, M.J.; Papapolymerou, J.; Ziolkowski, R.W.; Microwaves, Antennas and Propagation, IEE Proceedings—vol. 148, Issue 5, Oct. 2001 Ps:307-312.*

*Primary Examiner*—John B. Sotomayor
(74) *Attorney, Agent, or Firm*—Laura C. Hargitt

(57) ABSTRACT

A low-profile multi-band antenna module includes first and second antennas that transmit first and second radio frequency (RF) signals in a first and second RF band, respectively. A first RF multiplexer combines the first and second RF signals for transmission. The first antenna, second antenna, and first RF multiplexer are arranged on a panel. A transmission line communicates with the first RF multiplexer and transmits the first and second RF signals. A second RF multiplexer communicates with the transmission line and separates the first and second RF signals. At least one of the antennas communicates with an amplifier. The transmission line supplies direct current (DC) power to the amplifier. The first and second antenna are arranged on the panel in an orientation that minimizes electrical interference between the first and second antenna. A combination of the first and second antenna minimizes interference between the first and second RF band.

20 Claims, 6 Drawing Sheets

U.S. PATENT DOCUMENTS

2003/0219035 A1 * 11/2003 Schmidt ..................... 370/478
2004/0075608 A1 * 4/2004 Scott et al. .......... 343/700 MS
2004/0222923 A1 * 11/2004 Ekocevic ............. 343/700 MS
2005/0073456 A1 * 4/2005 Sievenpiper et al. ........ 342/175
2005/0143031 A1 * 6/2005 Moonen et al. .......... 455/168.1
2005/0157810 A1 * 7/2005 Raleigh et al. ............. 375/267

* cited by examiner

LOW-PROFILE, MULTI-BAND ANTENNA MODULE

FIELD OF THE INVENTION

The present invention relates to low-profile antennas, and more particularly to low-profile antennas with multi-band capabilities.

BACKGROUND OF THE INVENTION

Vehicles are receiving an increasing number of wireless services, such as cellular phone service, satellite radio, terrestrial radio, and Global Positioning System (GPS) service. As additional wireless services become available, a vehicle must be equipped to accommodate the different types of signals. Multi-band antennas are widely used in vehicles. When designing multi-band antennas, designers focus on cost, aesthetics, and aerodynamics.

Conventional multi-band antennas have a single receiving element with a broad bandwidth and are designed to receive signals from all bands of interest. However, it is difficult to make a single receiving element receive multiple bands because each wireless service requires a different radiation pattern.

Other multi-band antennas have a single module that includes multiple antenna receiving elements. Each antenna element receives a different service at a given frequency. The signals received by each antenna element are sent to different receivers using separate cables. However, as the number of cables increases, the cost increases. Additionally, certain combinations of antenna receiving elements can cause interference.

In addition to cost, the overall dimensions of the antenna are important. A large number of antenna receiving elements increases the size of the antenna module. As the size increases, the aerodynamic drag increases, which may cause wind noise and/or reduce fuel economy.

SUMMARY OF THE INVENTION

A low-profile multi-band antenna module according to the present invention includes a first antenna that transmits first radio frequency (RF) signals in a first RF band. A second antenna transmits second RF signals in a second RF band. A first RF multiplexer combines the first and second RF signals for transmission. The first antenna, second antenna, and first RF multiplexer are arranged on a panel.

In other features, a transmission line has a first end that communicates with the first RF multiplexer and transmits the first and second RF signals. A second RF multiplexer communicates with a second end of the transmission line and separates the first and second RF signals. The first and second RF multiplexer implement out-of-band rejection to minimize interference between the first and second RF signals. The first RF signals are transmitted from the second RF multiplexer to a first transceiver and the second RF signals are transmitted from the second RF multiplexer to a second transceiver. At least one of the first antenna and the second antenna communicates with at least one amplifier. The transmission line supplies direct current (DC) power to at least one amplifier.

In still other features of the invention, the first and second antenna are arranged on the panel in an orientation that minimizes electrical interference between the first and second antenna. A combination of the first and second antenna minimizes interference between the first and second RF band. At least one of the first antenna and the second antenna radiates circular polarization and vertical polarization that is ideal for satellite radio communication. At least one of the first antenna and the second antenna radiates circular polarization that is ideal for global positioning system (GPS) satellite communication. At least one of the first antenna and the second antenna radiates vertical polarization that is ideal for terrestrial communication.

In yet other features, the first RF band is an industrial, scientific, and medicine (ISM) band, the second RF band is a satellite radio band, and the second antenna suppresses interference from the ISM band and is located adjacent to the first antenna. The first RF band is a personal communications services (PCS) band, the second RF band is a satellite radio band, and the second antenna suppresses interference from the PCS band and is located adjacent to the first antenna. The first RF band is a PCS band, the second RF band is a GPS band, and the first and second antenna are located at opposite ends of the panel to minimize coupling between the first and second antenna. The first RF band is a satellite radio band and the first antenna is located near a center of the panel. The first RF band is a first ISM band at a first frequency, the second RF band is a second ISM band at a second frequency, the first antenna is located adjacent to the second antenna, the first antenna suppresses interference from the second ISM band, and the second antenna suppresses interference from the first ISM band. The first RF band is a GPS band, the second RF band is an ISM band, and the first antenna suppresses interference from the ISM band and is located adjacent to said second antenna.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
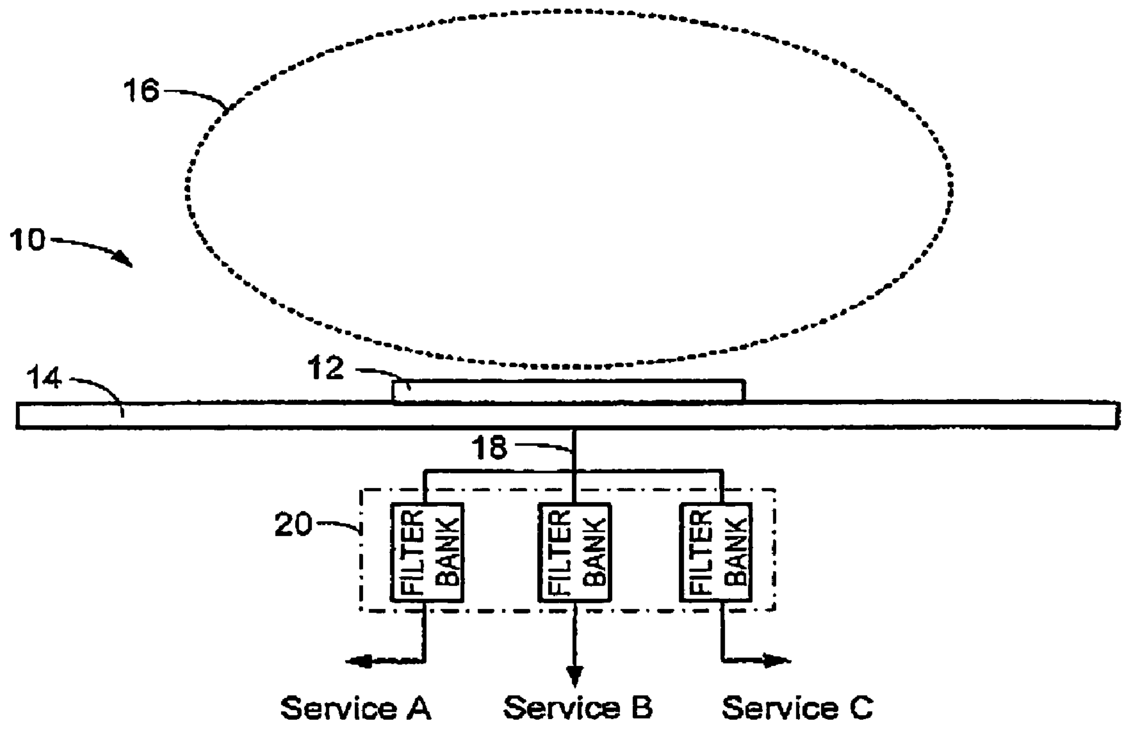
FIG. 1 prior art
FIG. 1 is a prior art multi-band antenna module with a single receiving element.

The following description of the preferred embodiment(s) is merely exemplary in nature and is in no way intended to limit the invention, its application, or uses. For purposes of clarity, the same reference numbers will be used in the drawings to identify similar elements.

Referring to FIG. 1, a first prior art multi-band antenna module 10 includes a single receiving element 12 with a broad bandwidth. The single receiving element 12 is mounted on a ground plane 14 and has a broad radiation pattern 16 designed to receive signals from all bands of interest. The received signals are transmitted on a single cable 18 to a set of filter banks 20, where the signals are filtered and distributed to their appropriate receivers. While a single receiving element 12 and a single cable 18 are used, it is difficult for a broad radiation pattern 16 to receive all of the desired signals. Many radio frequency (RF) services require different radiation patterns at specific frequencies.

Figure 2:
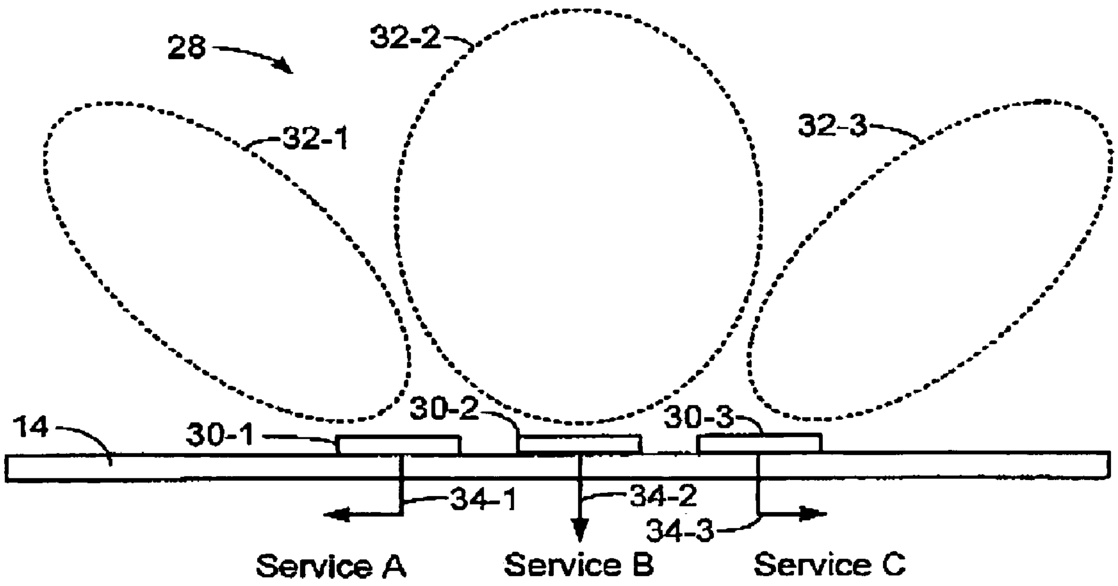
FIG. 2 prior art
FIG. 2 is a prior art multi-band antenna module with multiple receiving elements.

Referring now to FIG. 2, a second prior art multi-band antenna module 28 includes a group of receiving elements 30-1, 30-2, and 30-3 mounted on the ground plane 14. The group of receiving elements 30-1, 30-2, and 30-3 produces a combination of radiation patterns 32-1, 32-2, and 32-3. Each receiving element 32-1, 32-2, or 32-3 receives signals for a wireless service at a specific frequency. The signals are routed to an appropriate receiver on individual cables 34-1, 34-2, and 34-3. While signals for different wireless services are received, each service uses an individual cable 34-2, 34-2, or 34-3, which is costly and aesthetically displeasing.

Figure 3:
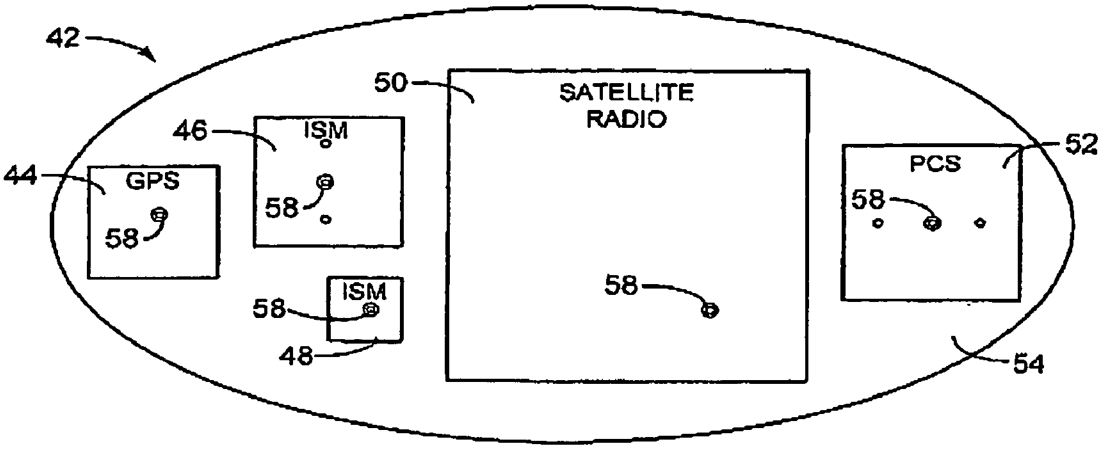
FIG. 3 is a top plan view of an exemplary multi-band antenna module.
Figure 4:
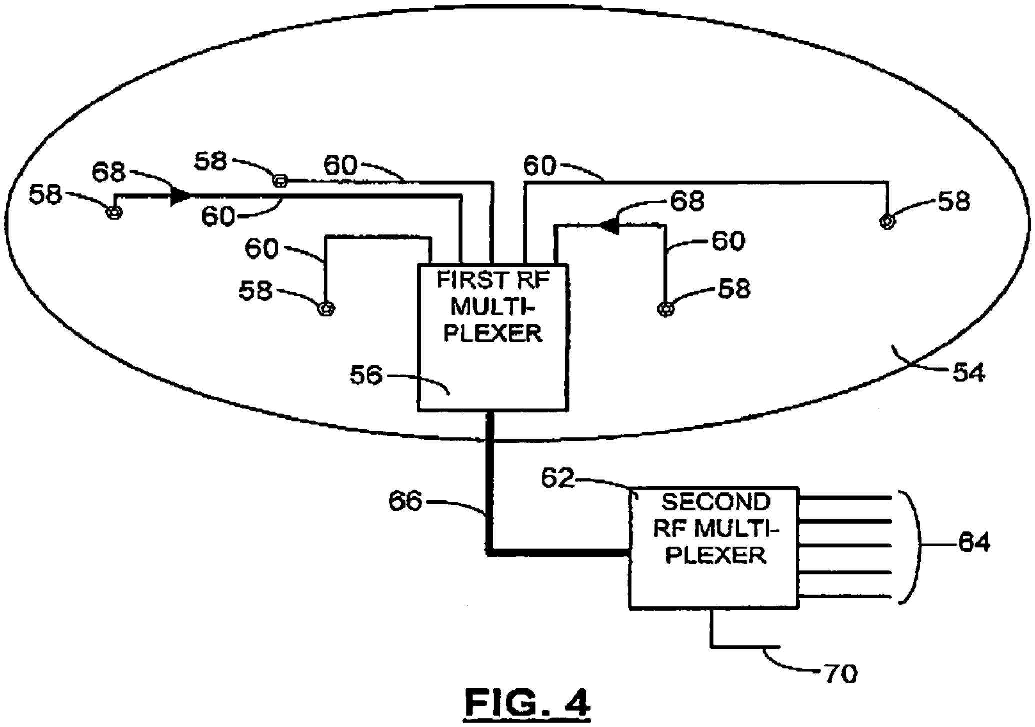
FIG. 4 is a bottom plan view of the multi-band antenna module of FIG. 3.

Referring now to FIGS. 3 and 4, an exemplary multi-band antenna module 42 according to the present invention includes a global positioning system (GPS) band antenna 44, a first industrial, scientific, and medicine (ISM) band antenna 46 that operates at a first frequency, a second ISM band antenna 48 that operates at a second frequency, a satellite radio band antenna 50, and a personal communications services (PCS) band antenna 52 mounted on a panel 54. The first ISM band antenna preferably operates at 2450 MHz, and the second ISM band antenna preferably operates at 5800 MHz. The satellite radio band antenna 50 radiates circular polarization and vertical polarization. The circular polarization is directed overhead, and the vertical polarization is directed towards the horizon. This enables the satellite radio band antenna 50 to communicate with satellites and terrestrial repeaters. The satellite radio band antenna 50 is preferably a cavity-backed crossed-slot antenna, such as the antenna described in "Crossed-Slot Antenna for Mobile Satellite and Terrestrial Radio Receptions", Ser. No. 10/409,513, filed Apr. 8, 2003, which is hereby incorporated by reference in its entirety, and can be constructed in many shapes including circular and rectangular.

The GPS band antenna 44 radiates circular polarization directed overhead. This enables the GPS band antenna 44 to communicate with satellites. The GPS band antenna 44 is preferably a dielectric-loaded patch antenna. The first ISM band antenna 46, the second ISM band antenna 48, and the PCS band antenna 52 radiate vertical polarization directed toward the horizon and no signal towards zenith. This radiation pattern is ideal for terrestrial communication and is similar to that of a monopole antenna. The first ISM band antenna 46, the second ISM band antenna 48, and the PCS band antenna 52 are preferably center-fed patch antennas, such as the antenna described in "Low-Profile Antenna", Ser. No. 10/408,004, filed Apr. 4, 2003, which is hereby incorporated by reference in its entirety. Center-fed patch antennas are low-profile and preferably constructed using low-cost stamped sheet metal or printed circuit techniques. An important feature of the multi-band antenna module 42 is that it is low-profile. All of the antennas 44, 46, 48, 50, and 52 are less than six millimeters tall and are optimized to produce the radiation pattern for their required services.

The positioning of the antennas 44, 46, 48, 50, and 52 on the panel 54 is important because of interference and coupling between the antennas 44, 46, 48, 50, and 52. The PCS band antenna 52 and the GPS band antenna 44 are located at opposite ends of the panel 54 due to their high coupling. The satellite radio band antenna 50 is located in the center of the panel 54 due to its large size. The first ISM band antenna 46 is located adjacent to the second ISM band antenna 48 because a receiver for either antenna is typically designed to allow for interference from the other. The first ISM band antenna 46 and the second ISM band antenna 48 are located adjacent to the satellite radio band antenna 50. The satellite radio band antenna 50 has unique suppression capabilities in the ISM band at 2450 MHz and is narrowband enough to suppress most of the radiation from the ISM band at 5800 MHz. The satellite radio band antenna 50 also suppresses radiation from and is located adjacent to the PCS band antenna 52. The first ISM band antenna 46 and the second ISM band antenna 48 do not receive significant interference from and are located adjacent to the GPS band antenna 44.

The positioning of the antennas 44, 46, 48, 50, and 52 on the panel 54 is also important because one or more of the antennas 44, 46, 48, 50, and 52 may contain built-in amplifiers. This is especially true for the satellite radio band antenna 50 and the GPS band antenna 44, which are receive-only antennas. The satellite radio band antenna 50 and the GPS band antenna 44 receive weak signals from distant satellites and typically include integrated low-noise amplifiers. The integrated low-noise amplifiers can easily be saturated and require the antennas 44, 46, 48, 50, and 52 to have low inter-element coupling. The input to low-noise amplifiers is often unfiltered and relies upon the inherent out-of-band rejection capabilities of the antenna. The amplified signal may need further filtering, so out-of-band signals are rarely a problem in the receiver system. Therefore, the signals from the antennas 44, 46, 48, 50, and 52 may be combined onto a single cable using an RF multiplexer.

A first RF multiplexer 56 is mounted on the bottom side of the panel 54 in FIG. 4. The panel 54 is formed as a printed circuit board to minimize the size of the multi-band antenna module 42, and feed holes 58 connect the antennas 44, 46, 48, 50, and 52 to feed circuits 60. The feed circuits 60 connect the feed holes 58 to the first RF multiplexer 56. The first RF multiplexer 56 combines the signals from the antennas 44, 46, 48, 50, and 52 for transmission. A second RF multiplexer 62 is located remote from the multi-band antenna module 42. The second RF multiplexer 62 separates the signals from the antennas 44, 46, 48, 50, and 52 to be transmitted on cables 64 to separate transceivers. A transmission line 66 connects the first RF multiplexer 56 and the second RF multiplexer 62. The panel 54 includes amplifiers 68 for one or more of the antennas 44, 46, 48, 50, and 52. The amplifiers 68 may contain multiple internal amplifiers and filters. A power cable 70 is connected to the second RF multiplexer 62. The power cable 70 supplies direct current (DC) power that is transmitted over the transmission line 66 to power the amplifiers 68. The first RF multiplexer 56 and the second RF multiplexer 62 preferably include out-of-band rejection to filter the signals from the antennas 44, 46, 48, 50, and 52, or, in the alternative, additional filters are used. Combining all of the signals from the antennas 44, 46, 48, 50, and 52 and a DC supply on the transmission line 66 results in a simpler design and a lower installation cost.

Figure 5:
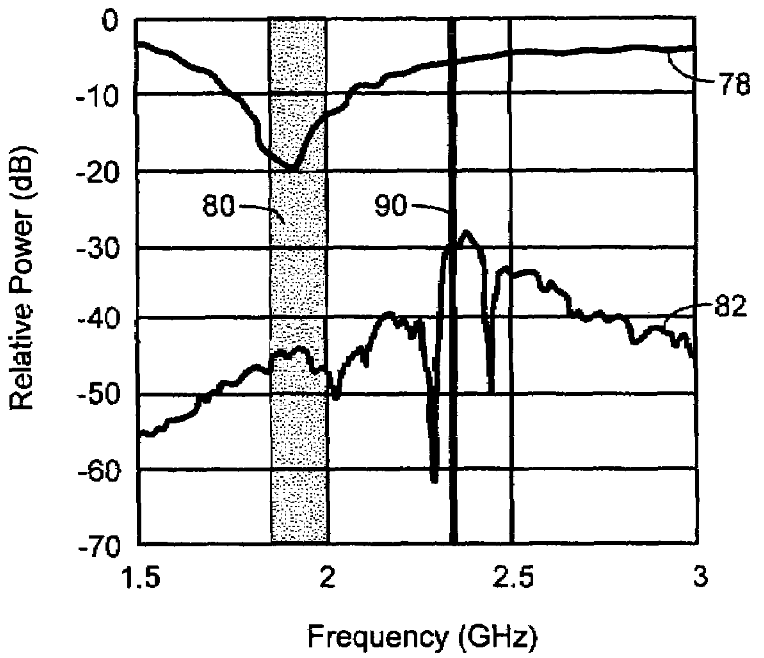
FIG. 5 is a graph showing the relative power of an interferer in the PCS band received by a satellite radio band antenna as function of frequency.
Figure 6:
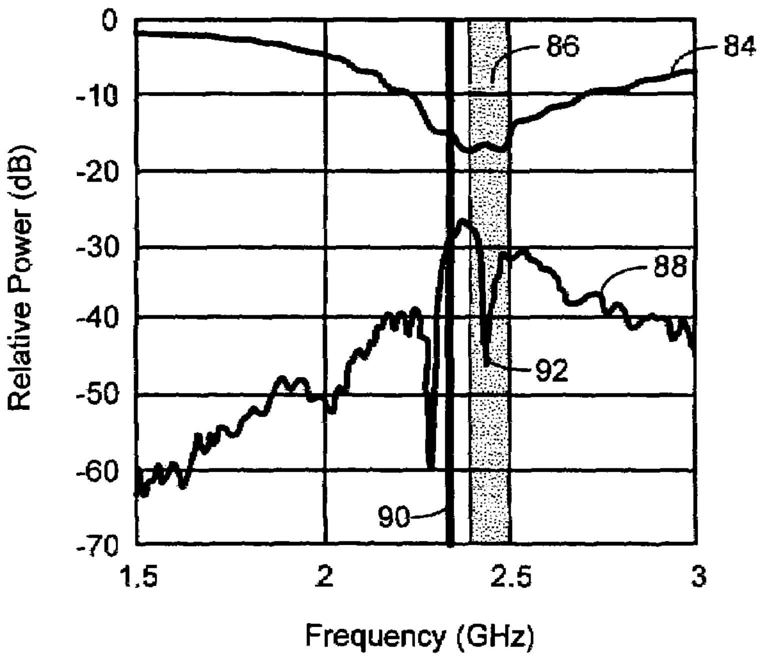
FIG. 6 is a graph showing the relative power of an interferer in the ISM band at 2450 MHz received by a satellite radio band antenna as a function of frequency.

Referring now to FIGS. 5 and 6, the ability of the satellite radio band antenna 50 to suppress the PCS band and the ISM band at 2450 MHz is illustrated. FIG. 5 shows an interferer signal 78 tuned to the PCS band, indicated at 80, and a received signal 82 by the satellite radio band antenna 50 at different frequencies. FIG. 6 shows an interferer signal 84 tuned to the ISM band at 2450 MHz, indicated at 86, and a received signal 88 by the satellite radio band antenna 50 at different frequencies. The satellite radio band is indicated at 90 in FIGS. 5 and 6. The suppression is important because the satellite radio band antenna 50 has a sensitive amplifier, and it is important not to saturate it. The PCS band antenna 52, the first ISM band antenna 46, and the second ISM band antenna 48 transmit and receive signals. Therefore, it is important that as little energy as possible from those bands leaks into the satellite radio band antenna 50. It is difficult to isolate the ISM band and the satellite radio band because the frequencies are close together. The signal rejection in the 2.45 GHz band is particularly strong due to a sharp dip 92 in the satellite radio band antenna 50 sensitivity. This significantly helps to isolate the bands.

Referring now to FIGS. 7–12, there is a risk of the transmission of one of the antennas 44, 46, 48, 50, and 52 saturating the amplifier of another antenna since many of the antennas include integrated amplifiers. The coupling between antennas that transmit and receive and those that only receive are especially critical. The coupling between each of the antennas 44, 46, 48, 50, and 52 is small, even for short separation distances. In most cases the coupling is less than −20 dB, which is desirable.

Figure 7:
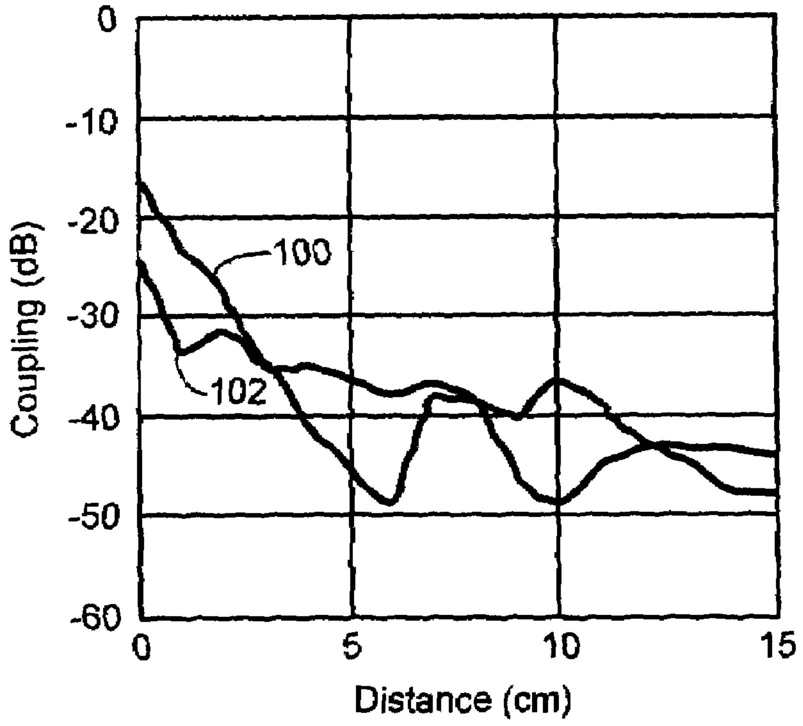
FIG. 7 is a graph showing coupling between a GPS band antenna and an ISM band antenna at 2450 MHz as a function of distance.
Figure 8:
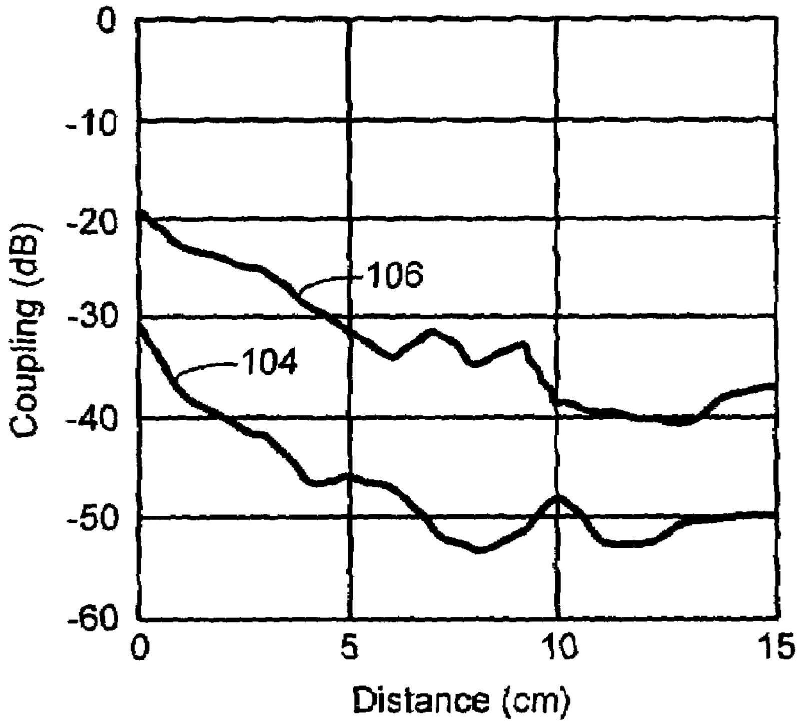
FIG. 8 is a graph showing coupling between an ISM band antenna at 5800 MHz and a GPS band antenna as a function of distance.
Figure 9:
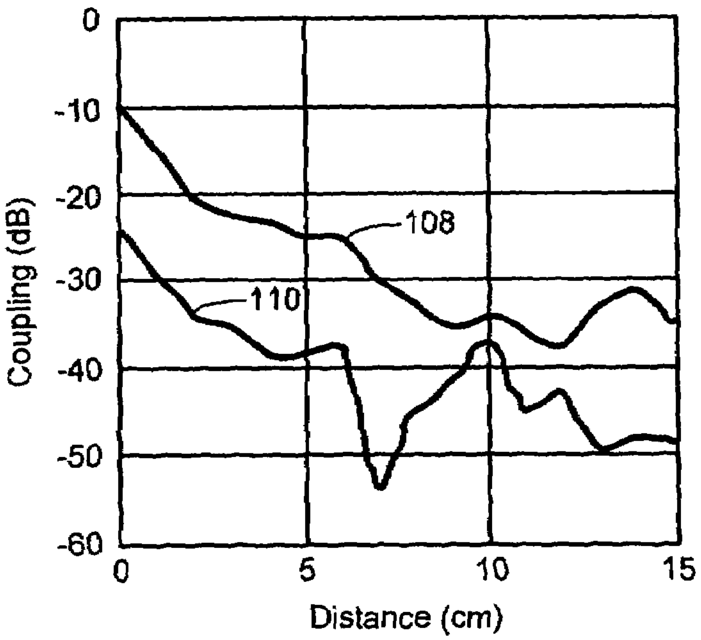
FIG. 9 is a graph showing coupling between a GPS band antenna and a PCS band antenna as a function of distance.
Figure 10:
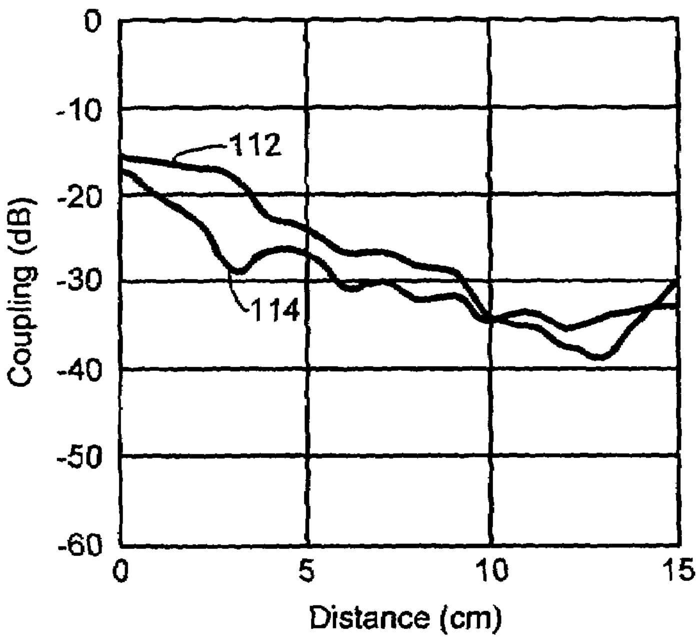
FIG. 10 is a graph showing coupling between a satellite radio band antenna and an ISM band antenna at 2450 MHz as a function of distance.
Figure 11:
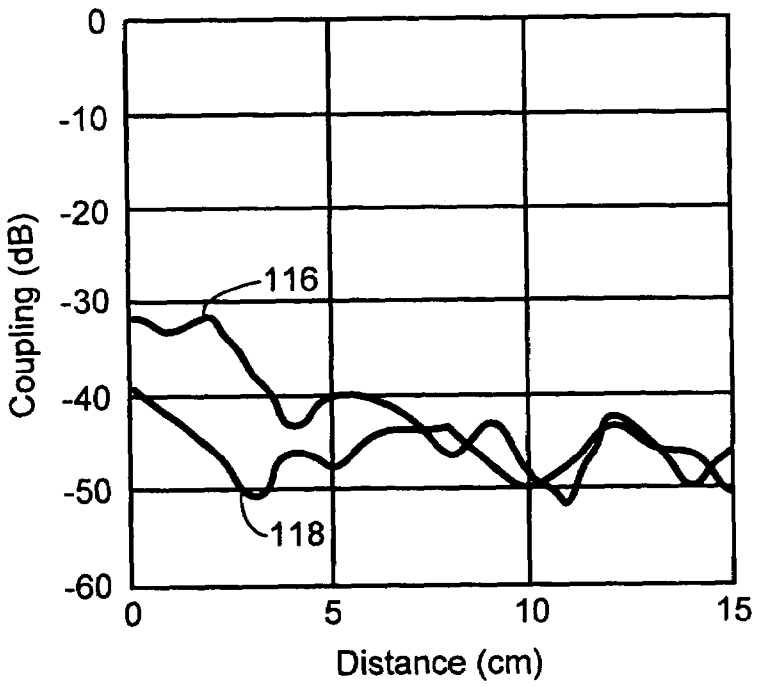
FIG. 11 is a graph showing coupling between a satellite radio band antenna and an ISM band antenna at 5800 MHz as a function of distance.
Figure 12:
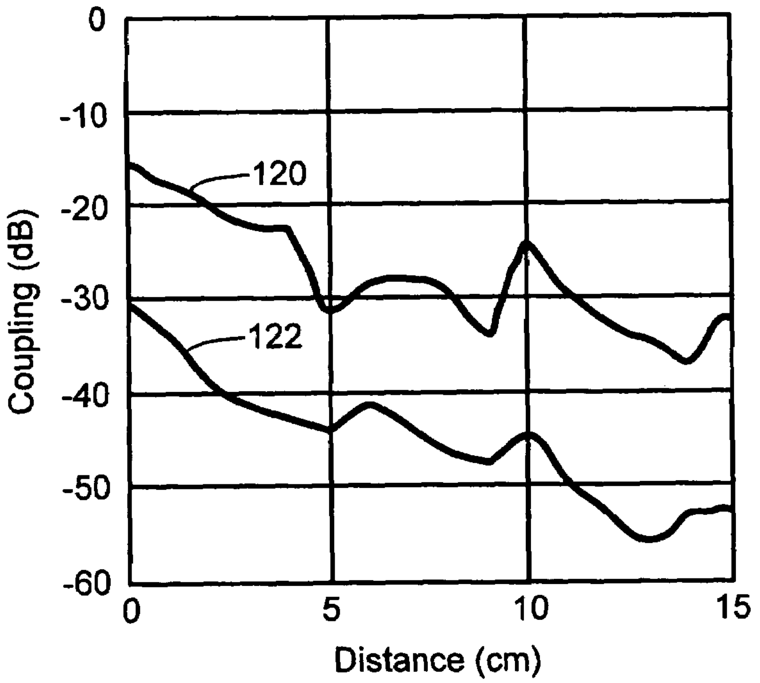
FIG. 12 is a graph showing coupling between a satellite radio band antenna and a PCS band antenna as a function of distance.

FIG. 7 shows the GPS band antenna coupling 100 and the first ISM band antenna coupling 102. FIG. 8 shows the GPS band antenna coupling 104 and the second ISM band antenna coupling 106. FIG. 9 shows the GPS band antenna coupling 108 and the PCS band antenna coupling 110. Because of the high coupling, the GPS band antenna 44 and the PCS band antenna 52 are located at opposite ends of the panel 54. FIG. 10 shows the satellite radio band antenna coupling 112 and the first ISM band antenna coupling 114. The coupling between the satellite radio band antenna 50 and the first ISM band antenna 46 would be much greater if the satellite radio band antenna 50 did not have suppression abilities for the ISM band. FIG. 11 shows the satellite radio band antenna coupling 116 and the second ISM band antenna coupling 118. FIG. 12 shows the satellite radio band antenna coupling 120 and the PCS band antenna coupling 122. Most of the coupling occurs in the satellite radio band, where the PCS band antenna 52 does not transmit.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A low-profile multi-band antenna module, comprising:

a first low-profile antenna that transmits first radio frequency (RF) signals in a first RF band;

a second low-profile antenna that transmits second RF signals in a second RF band; and a first RF multiplexer that combines said first RF signals and said second RF signals for transmission, wherein said first antenna, said second antenna, and said first RF multiplexer are arranged on a panel.

2. The low-profile multi-band antenna module of claim 1 further comprising:

a transmission line with a first end that communicates with said first RF multiplexer and that transmits said first RF signals and said second RF signals.

3. The low-profile multi-band antenna module of claim 2 further comprising:

a second RF multiplexer that communicates with a second end of said transmission line and that separates said first RF signals and said second RF signals.

4. The low-profile multi-band antenna module of claim 3 wherein said first RF multiplexer and said second RF multiplexer implement out-of-band rejection to minimize interference between said first RF signals and said second RF signals.

5. The low-profile multi-band antenna module of claim 3 wherein said first RF signals are transmitted from said second RF multiplexer to a first transceiver and said second RF signals are transmitted from said second RF multiplexer to a second transceiver.

6. The low-profile multi-band antenna module of claim 3 wherein at least one of said first antenna and said second antenna communicates with at least one amplifier.

7. The low-profile multi-band antenna module of claim 6 wherein said transmission line supplies direct current (DC) power to said at least one amplifier.

8. The low-profile multi-band antenna module of claim 1 wherein said first antenna and said second antenna are arranged on said panel in an orientation that minimizes electrical interference between said first and second antenna.

9. The low-profile multi-band antenna module of claim 1 wherein a combination of said first antenna and said second antenna minimizes interference between said first RF band and said second RF band.

10. The low-profile multi-band antenna module of claim 1 wherein at least one of said first antenna and said second antenna radiates circular polarization and vertical polarization that is ideal for satellite radio communication.

11. The low-profile multi-band antenna module of claim 1 wherein at least one of said first antenna and said second antenna radiates circular polarization that is ideal for global positioning system (GPS) satellite communication.

12. The low-profile multi-band antenna module of claim 1 wherein at least one of said first antenna and said second antenna radiates vertical polarization that is ideal for terrestrial communication.

13. The low-profile multi-band antenna module of claim 1 wherein said first RF band is an industrial, scientific, and medicine (ISM) band, said second RF band is a satellite radio band, and said second antenna suppresses interference from said ISM band and is located adjacent to said first antenna.

14. The low-profile multi-band antenna module of claim 1 wherein said first RF band is a personal communications services (PCS) band, said second RF band is a satellite radio band, and said second antenna suppresses interference from said PCS band and is located adjacent to said first antenna.

15. The low-profile multi-band antenna module of claim 1 wherein said first RF band is a PCS band, said second RF band is a GPS band, and said first and second antenna are located at opposite ends of said panel to minimize coupling between said first and second antenna.

16. The low-profile multi-band antenna module of claim 1 wherein said first RF band is a satellite radio band and said first antenna is located near a center of said panel.

17. The low-profile multi-band antenna module of claim 1 wherein said first RF band is a first ISM band at a first frequency, said second RF band is a second ISM band at a second frequency, said first antenna is located adjacent to said second antenna, said first antenna suppresses interference from said second ISM band, and said second antenna suppresses interference from said first ISM band.

18. The low-profile multi-band antenna module of claim 1 wherein said first RF band is a GPS band, said second RF band is an ISM band, and said first antenna suppresses interference from said ISM band and is located adjacent to said second antenna.

19. A low-profile multi-band antenna module, comprising:

a first antenna that transmits first radio frequency (RF) signals in a GPS band;

a second antenna that transmits second RF signals in a first ISM band;

a third antenna that transmits third RF signals in a second ISM band;

a fourth antenna that transmits fourth RF signals in a satellite radio band;

a fifth antenna that transmits fifth RF signals in a PCS band; and a first RF multiplexer that combines said first, second, third, fourth, and fifth RF signals for transmission, wherein said first, second, third, fourth, and fifth antenna, and said first RF multiplexer are arranged on a panel.

20. The low-profile multi-band antenna module of claim 19 further comprising:

a transmission line with a first end that communicates with said first RF multiplexer and that transmits said first, second, third, fourth, and fifth RF signals; and a second RF multiplexer that communicates with a second end of said transmission line and that separates said first, second, third, fourth, and fifth RF signals.

* * * * *